(No Model.)

F. W. MORGAN.
STEAM PACKING.

No. 394,990. Patented Dec. 25, 1888.

Witnesses:
P. M. Hulbert,
John Schuman.

Inventor:
Fred W. Morgan,
By Thos. S. Sprague & Son
Att'y.

UNITED STATES PATENT OFFICE.

FRED W. MORGAN, OF CHICAGO, ILLINOIS.

STEAM-PACKING.

SPECIFICATION forming part of Letters Patent No. 394,990, dated December 25, 1888.

Application filed April 3, 1888. Serial No. 269,481. (No model.)

*To all whom it may concern:*

Be it known that I, FRED W. MORGAN, a citizen of the United States, residing at Chicago, in the county of Cook and State of Illinois, have invented certain new and useful Improvements in Steam-Packing, of which the following is a specification, reference being had therein to the accompanying drawings.

This invention relates to certain new and useful improvements in steam and water packing; and the invention consists in the novel construction thereof, as more fully hereinafter described, and specifically pointed out in the claim.

Figure 1:
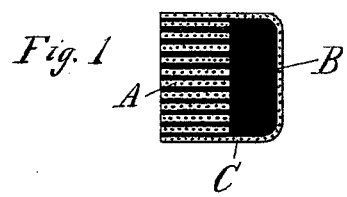
Figure 2:
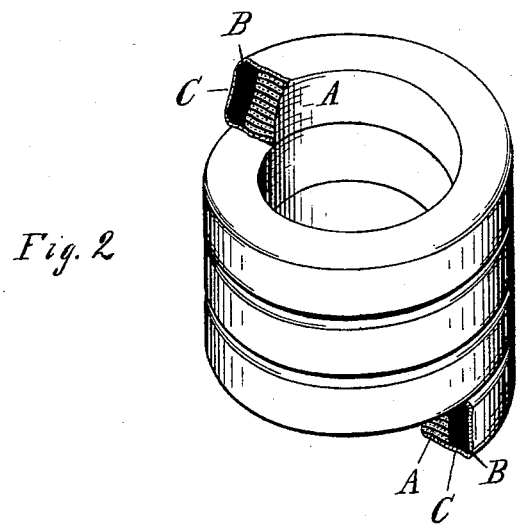

In the drawings which accompany this specification, Figure 1 is an enlarged cross-section of my improved packing. Fig. 2 is a coil of packing of the form in which it is manufactured.

The body of the packing consists of the fibrous strip A and rubber strip B, united together to form a square or rectangular cross-section. The strip A constitutes the wearing-face, and is composed of a series of layers of duck or other fibrous material, united together by intervening layers of rubber. The strip B is entirely of rubber and forms an elastic backing for the wearing-surface.

C is an outside covering, of duck or other fibrous material, preferably formed by extending the top and bottom layers of the wearing-surface around the rubber, so as to envelop it completely.

The packing being constructed as described is compacted into a spiral coil, and in this form it is subjected to vulcanization, the object of which is to compel it to permanently assume the form of a cylindrical coil.

This packing being composed of a rigid, inelastic, fibrous, wearing-body, backed up by a very soft, easily-expanded cushion of rubber, which is protected from the destructive action of oils or grease by a covering of cotton duck or other fibrous material, which completely envelops the rubber, and the whole formed into the curve necessary to fit the rod and stuffing-box easily and accurately, has the effect of a good metallic packing and forms a much more durable packing than that usually composed of fibrous materials. The vulcanization holds the rubber in its spiral form, and, therefore, if the packing has been placed around a rod or piston-rod of larger diameter than the coils of the packing the latter will adjust itself, both as to diameter and length, and in this latter respect the advantage of the outer covering, which prevents the coils from sticking together, is evident. Thus my improved form of packing is doubly adjustable.

A further advantage of my packing is that it is economical, as the required quantity for use in a given place may be more readily determined by having the packing prepared in the form of a coil, as a flat bearing may be readily cut upon the ends to distribute the pressure of the stuffing-box gland upon it.

I do not claim as new the combination of a rubber back with a fibrous wearing-body; but my invention consists in enveloping the rubber back with a layer or layers of cotton duck or other fibrous material, in such a manner that the sides as well as the back of the rubber cushion are covered and protected from oils and grease, and the contiguous coils of the packing, when subjected to use, are prevented from sticking together.

I am aware that it is not new to vulcanize cords or ropes of rubber in coiled state to secure a permanent helical set. I am also aware that it has been proposed to form a packing of fibrous strips with intervening layers of rubber, a rubber backing and a covering consisting of a plurality of pieces secured to the said strips and to the backing, and do not claim such as of my invention. I deem it important that the covering C be formed of a single piece embracing the top, bottom, and one side of the packing and thus binding the whole together. The importance of this will be readily seen when it is considered that this construction prevents the opening of the outer corner-joints, which would occur under pressure if there were joints at the corners to open. This opening of the corners would admit the oil to the rubber and thus destroy it, while by my construction the oil is kept from the rubber much longer than by any plan heretofore proposed, and the packing thus lasts much longer.

What I claim as my invention is—

In a steam-packing, the combination of a rubber backing, a wearing-strip composed of a series of layers of duck united by intervening layers of rubber with their edges arranged to form the wearing-surface, an outside covering of duck forming the top and bottom of the wearing-strip and the outer edge of the packing, the whole vulcanized into spiral form, substantially as described.

In testimony whereof I affix my signature, in presence of two witnesses, this 19th day of March, 1888.

FRED W. MORGAN.

Witnesses:
 JOHN WILLIAMS,
 JOHN HERKENHOFF.